US012769532B2

(12) United States Patent
Lee et al.

(10) Patent No.: US 12,769,532 B2
(45) Date of Patent: Oct. 20, 2026

(54) FIRMWARE UPDATE SYSTEM OF BATTERY MANAGEMENT SYSTEM AND OPERATING METHOD THEREFOR

(71) Applicant: LG ENERGY SOLUTION, LTD., Seoul (KR)

(72) Inventors: Ye Seul Lee, Daejeon (KR); Seong Yeol Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 213 days.

(21) Appl. No.: 18/280,887

(22) PCT Filed: Oct. 6, 2022

(86) PCT No.: PCT/KR2022/015026

§ 371 (c)(1),
(2) Date: Sep. 7, 2023

(87) PCT Pub. No.: WO2023/059082

PCT Pub. Date: Apr. 13, 2023

(65) Prior Publication Data

US 2024/0152349 A1 May 9, 2024

(30) Foreign Application Priority Data

Oct. 6, 2021 (KR) ........................ 10-2021-0132752

(51) Int. Cl.
*G06F 8/65* (2018.01)
*H01M 10/42* (2006.01)
*H02J 7/82* (2026.01)

(52) U.S. Cl.
CPC ............ *G06F 8/65* (2013.01); *H01M 10/425* (2013.01); *H02J 7/82* (2026.01); *H01M 2010/4271* (2013.01)

(58) Field of Classification Search
CPC ....... G06F 8/65; H02J 7/0048; H01M 10/425; H01M 2010/4271
See application file for complete search history.

(56) References Cited

U.S. PATENT DOCUMENTS

2003/0076072 A1 4/2003 Tojo et al.
2003/0115001 A1 6/2003 Odaohhara
(Continued)

FOREIGN PATENT DOCUMENTS

CN 109298876 A 2/2019
CN 111552490 A 8/2020
(Continued)

OTHER PUBLICATIONS

Blank; Translated DE 102016011768 A1 (Year: 2018).*
(Continued)

*Primary Examiner* — S. Sough
*Assistant Examiner* — Cuong V Luu
(74) *Attorney, Agent, or Firm* — Birch, Stewart, Kolasch & Birch, LLP

(57) ABSTRACT

Discussed is a battery management system that may include at least one battery module, one or more battery module management apparatuses respectively connected to the battery module, and a battery pack management apparatus having embedded therein firmware and configured to manage the one or more battery module management apparatuses, in which the battery pack management apparatus is further configured to divide the firmware to generate divided firmware packet information and transmit the divided firmware packet information to the one or more battery module management apparatuses, and the one or more battery module management apparatuses are further configured to moni-
(Continued)

tor a state of the connected at least one battery module and transmit monitored battery data information to the battery pack management apparatus.

20 Claims, 8 Drawing Sheets

(56) References Cited

U.S. PATENT DOCUMENTS

2010/0213891 A1 8/2010 Nishikawa et al.
2013/0117740 A1 5/2013 Oh
2013/0305237 A1* 11/2013 Eisenhauer ............... G06F 8/65 717/172
2015/0052512 A1* 2/2015 Kostadinov ............... G06F 8/65 717/173
2015/0295430 A1 10/2015 Wright et al.
2015/0363210 A1* 12/2015 Wehrman .................. G06F 8/65 701/31.5
2018/0018160 A1 1/2018 Teraoka et al.
2018/0099568 A1 4/2018 Ishigaki
2018/0157483 A1 6/2018 Lee et al.
2019/0027719 A1 1/2019 Kim et al.
2019/0028831 A1 1/2019 Kumar et al.
2019/0138298 A1 5/2019 Teraoka et al.
2019/0265965 A1* 8/2019 Acharya ................. H04L 12/40
2020/0119564 A1 4/2020 Lee
2021/0382539 A1* 12/2021 Suryanarayana ......... G06F 8/65
2022/0240190 A1 7/2022 Hong et al.
2024/0095019 A1 3/2024 Han et al.

FOREIGN PATENT DOCUMENTS

CN 112201863 A * 1/2021 .......... H01M 10/425
CN 111104145 B 8/2021
CN 111930407 B 8/2021
CN 113328477 A * 8/2021 .............. B60L 58/18
DE 102016011768 A1 * 4/2018
JP 2001-275270 A 10/2001
JP 3900469 B2 4/2007
JP 2013-207902 A 10/2013
JP 5305975 B2 10/2013
JP 2015-152941 A 8/2015
JP 2016-170740 A 9/2016
JP 2017-199183 A 11/2017
JP 6760906 B2 9/2020
JP 2020-205587 A 12/2020
KR 10-2013-0049923 A 5/2013
KR 10-2014-0073949 A 6/2014
KR 10-2018-0102413 A 9/2018
KR 10-2083657 B1 3/2020
KR 10-2020-0040997 A 4/2020
KR 10-2020-0059965 A 5/2020
KR 10-2123676 B1 6/2020
KR 10-2020-0144053 A 12/2020
KR 10-2236058 B1 4/2021
TW 201402369 A 1/2014

OTHER PUBLICATIONS

Anirudh Badam; Software Defined Batteries; ACM; pp. 215-229; retrieved on Apr. 16, 2026 (Year: 2015).*
Anonymous, "Maximum transmission unit," Wikipedia, XP093178655 Sep. 10, 2021, pp. 1-6.
Anonymous, "Network packet," Wikipedia, XP093179123, Sep. 20, 2021, pp. 1-4.
Extended European Search Report for European Application No. 22878903.8, dated Jul. 9, 2024.
International Search Report (PCT/ISA/210) issued in PCT/KR2022/015026, dated Jan. 13, 2023.

* cited by examiner

FIRMWARE UPDATE SYSTEM OF BATTERY MANAGEMENT SYSTEM AND OPERATING METHOD THEREFOR

CROSS-REFERENCE TO RELATED APPLICATION

This application claims priority to and the benefit of Korean Patent Application No. 10-2021-0132752 filed in the Korean Intellectual Property Office on Oct. 6, 2021, the entire contents of which are incorporated herein by reference.

TECHNICAL FIELD

Embodiments disclosed herein relate to a firmware update system in a battery data management system and a method therefor.

BACKGROUND ART

An energy storage system (ESS) is a device that improves power use efficiency by storing generated electricity in a storage device such as a battery and supplying power when needed, and includes a battery that stores electricity and components for efficiently managing and controlling the battery. Among those components, a battery management system (BMS) uses each sensor connected to a battery module to measure battery state information such as temperature, current, voltage, etc., and by doing so, plays a role of calculating data on dangerous problems such as overcharge or over discharge occurring in charge and/or discharge of the battery to control the temperature, current, voltage, etc., according to the state of the battery, thereby allowing the battery to operate in a stable state.

The BMS may include hardware that manages an operation of the battery and software that controls the hardware. Thus, for a more stable operation, the software of the BMS needs to be updated. The BMS may include a battery module management apparatus that monitors the state of each battery module and a battery pack management apparatus that manages the battery module management apparatus. When the software of the BMS is updated, the software of the battery pack management apparatus is updated and the battery pack management apparatus transmits update information to each battery module management apparatus. Each battery module management apparatus transmits state data of each connected battery module, etc., to the battery pack management apparatus to maintain the stable state of the BMS to allow collection of the information.

The matters described as the background art are merely for improving the understanding of the background of the present disclosure, and should not be considered as acknowledging that they correspond to the prior art known to those of ordinary skill in the art.

DISCLOSURE

Technical Problem

When a battery management system is updated, firmware updated in a battery pack management apparatus is transmitted to one or more battery module management apparatuses. The one or more battery module management apparatuses may monitor a state of each connected battery module and transmit monitored battery data information to a battery pack management apparatus. However, when the firmware updated in the battery pack management apparatus is transmitted to the one or more battery module management apparatuses, the battery module management apparatus is not able to transmit monitored battery data information to the battery pack management apparatus, such that some battery data information may be lost. When the size of update information of the firmware embedded in the battery pack management apparatus is sufficiently large, the amount of battery data information lost without being collected may be huge, disrupting an operation of the battery management system.

When the battery management system is updated, the firmware updated in the battery pack management apparatus is transmitted to the one or more battery module management apparatuses, and when some battery module management apparatuses have poor communication with the battery pack management apparatus, i.e., the battery module management device may fail to receive the updated firmware in a communication shadow area in relation to the battery pack management apparatus.

Technical Solution

A battery management system according to an embodiment disclosed herein includes at least one battery module, one or more battery module management apparatuses respectively connected to the at least one battery module, and a battery pack management apparatus having embedded therein firmware and configured to manage the one or more battery module management apparatuses, in which the battery pack management apparatus is further configured to divide the firmware to generate divided firmware packet information and transmit the divided firmware packet information to the one or more battery module management apparatuses, and the one or more battery module management apparatuses are further configured to monitor a state of the connected at least one battery module and transmit monitored battery data information to the battery pack management apparatus.

According to an embodiment, the battery pack management apparatus may be further configured to transmit a non-divided firmware to the one or more battery module management apparatuses when a firmware batch download command is input according to a scheme designated in the battery pack management apparatus.

According to an embodiment, the battery pack management apparatus may be further configured to store length information of the firmware packet information transmitted to the one or more battery module management apparatuses.

According to an embodiment, the one or more battery module management apparatuses may be further configured to transmit the monitored battery data information to at least some of the other battery module management apparatuses.

According to an embodiment, the one or more battery module management apparatuses may be further configured to encode the monitored battery data information and received divided firmware packet information together to generate encoding information and transmit the encoding information to at least some of the other battery module management apparatuses.

According to an embodiment, the one or more battery module management apparatuses may be further configured to identify the divided firmware packet information by using the battery data information and the encoding information received from another of the one or more battery module management apparatuses.

An operating method of a battery management system according to an embodiment disclosed herein includes dividing firmware embedded in a battery pack management apparatus to generate divided firmware packet information, transmitting, by the battery pack management apparatus, the divided firmware packet information to one or more battery module management apparatuses, and monitoring, by the one or more battery module management apparatuses, a state of a connected battery module and transmitting monitored battery data information to the battery pack management apparatus.

According to an embodiment, the operating method may further include transmitting a non-divided firmware to the one or more battery module management apparatuses when a firmware batch download command is input according to a scheme designated in the battery pack management apparatus.

According to an embodiment, the operating method may further include storing, by the battery pack management apparatus, length information of the divided firmware packet information transmitted to the one or more battery module management apparatuses.

According to an embodiment, the operating method may further include transmitting, by the one or more battery module management apparatuses, the monitored battery data information to at least some of the other battery module management apparatuses.

According to an embodiment, the operating method may further include encoding, by the one or more battery module management apparatuses, the monitored battery data information and received divided firmware packet information to generate encoding information and transmitting the encoding information to at least some of the other battery module management apparatuses.

According to an embodiment, the operating method may further include identifying, by the one or more battery module management apparatuses, the divided firmware packet information by using the battery data information and the encoding information received from another of the one or more battery module management apparatuses.

A battery management system according to an embodiment disclosed herein includes one or more battery modules, one or more battery module management apparatuses respectively connected to the one or more battery modules, a battery pack management apparatus having embedded therein firmware and configured to manage the one or more battery module management apparatuses, and a controller connected to the one or more battery module management apparatuses and the battery pack management apparatus, in which the controller is configured to, by controlling the battery pack management apparatus, divide the firmware to generate divided firmware packet information and transmit the divided firmware packet information to the one or more battery module management apparatuses and, by controlling the one or more battery module management apparatuses, monitor a state of the connected one or more battery modules and transmit monitored battery data information to the battery pack management apparatus.

According to an embodiment, the controller may be further configured to, by controlling the battery pack management apparatus, transmit a non-divided firmware to the one or more battery module management apparatuses when a firmware batch download command is input according to a scheme designated in the battery pack management apparatus.

According to an embodiment, the controller may be further configured to, by controlling the battery pack management apparatus, store length information of the divided firmware packet information transmitted to the one or more battery module management apparatuses.

According to an embodiment, the controller may be further configured to, by controlling the one or more battery module management apparatuses, transmit the monitored battery data information to at least some of the other battery module management apparatuses.

According to an embodiment, the controller may be further configured to, by controlling the one or more battery module management apparatuses, encode the monitored battery data information and the divided firmware packet information together to generate encoding information and transmit the encoding information to at least some of the other battery module management apparatuses.

According to an embodiment, the controller may be further configured to, by controlling the one or more battery module management apparatuses, identify the divided firmware packet information by using the battery data information and the encoding information received from another of the one or more battery module management apparatuses.

Advantageous Effects

According to embodiments disclosed herein, a battery management system may be updated without a loss of battery data information even during driving or operation of a battery module.

According to embodiments disclosed herein, when the battery management system is updated, even if there is a battery module management apparatus having poor communication with the battery pack management apparatus, another battery module management apparatus having normal communication with the battery pack management apparatus directly or indirectly receives received firmware packet information to identify the firmware packet information, thereby normally updating the battery management system.

Moreover, various effects recognized directly or indirectly from the disclosure may be provided.

DESCRIPTION OF DRAWINGS

With regard to the description of the drawings, similar reference numerals may be used to refer to similar or related components.

MODE FOR INVENTION

Figure 1:
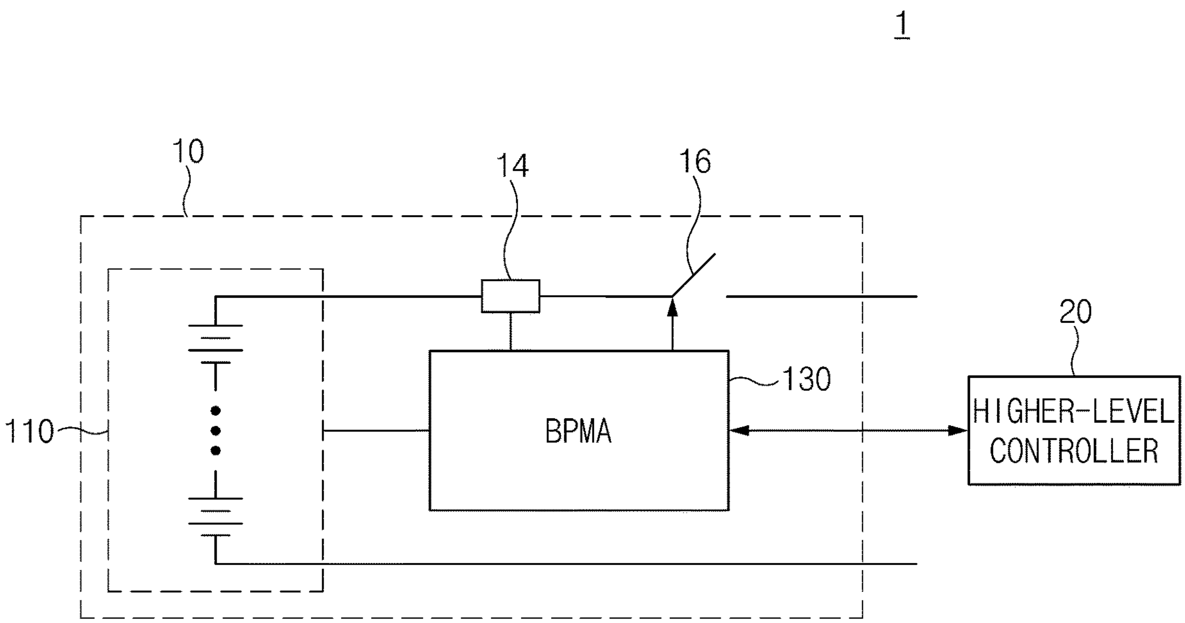
FIG. 1 is a block diagram of a general battery pack including a battery management apparatus according to an embodiment disclosed herein.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1$^{st}$", "2$^{nd}$", "first", "second", "A", "B", "(a)", or "(b)" may be used to simply distinguish a corresponding component from another, and does not limit the components in other aspect (e.g., importance or order), unless mentioned otherwise.

Herein, it is to be understood that when an element (e.g., a first element) is referred to, with or without the term "operatively" or "communicatively", as "connected with", "coupled with", or "linked with", or "coupled to" or "connected to" to another element (e.g., a second element), it means that the element may be connected with the other element directly (e.g., wiredly), wirelessly, or via a third element.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram of a general battery pack including a battery management apparatus according to an embodiment disclosed herein.

More specifically, FIG. 1 schematically shows a battery control system 1 including a battery pack 10 and a higher-level controller 20 included in a higher-level system according to an embodiment disclosed herein. In this case, the battery pack 10 shown in FIG. 1 may correspond to a component corresponding to the battery management system 100 disclosed herein.

As shown in FIG. 1, the battery pack 10 may include a plurality of battery modules 110, a sensor 14, a switching unit 16, and a battery pack management apparatus (BPMA) 130. The battery pack 10 may include the battery module 110, the sensor 14, the switching unit 16, and the battery pack management apparatus 130 provided in plural.

The plurality of battery modules 110 may include at least one chargeable/dischargeable battery cells. In this case, the plurality of battery modules 110 may be connected in series or in parallel.

The sensor 14 may detect current flowing in the battery pack 10. A detected signal may be transmitted to the battery pack management apparatus 130.

The switching unit 16 may be connected in series to a (+) terminal side or a (−) terminal side of the battery module 110 to control the charging/discharging current flow of the battery module 110. For example, the switching unit 16 may use at least one relay, a magnetic contactor, etc., according to the specifications of the battery pack 10.

The battery pack management apparatus 130 may monitor the voltage, current, temperature, etc., of the battery pack 10 to perform control and management to prevent overcharging and over discharging, etc., and may include, for example, a rack battery management system (RBMS).

The battery pack management apparatus 130, which is an interface for receiving measurement values of various parameter values described above, may include a plurality of terminals and a circuit, etc., connected to the terminals to process received values. The battery pack management apparatus 130 may control on/off of the switching unit 16, e.g., a relay, a contactor, etc., and may be connected to the battery module 110 to monitor the state of each battery module 110.

The higher-level controller 20 may transmit a control signal for controlling the battery module 110 to the battery pack management apparatus 130. Thus, the battery pack management apparatus 130 may also be controlled in terms of an operation thereof based on a control signal applied from the higher-level controller 20. Also, the battery module 110 may be a component included in an energy storage system (ESS). In this case, the higher-level controller 20 may be a controller (a bank battery management system (BBMS)) of a battery bank including the plurality of packs 10 or an ESS controller for controlling the entire ESS including a plurality of banks. However, the battery pack 10 is not limited to such a purpose.

Figure 2:
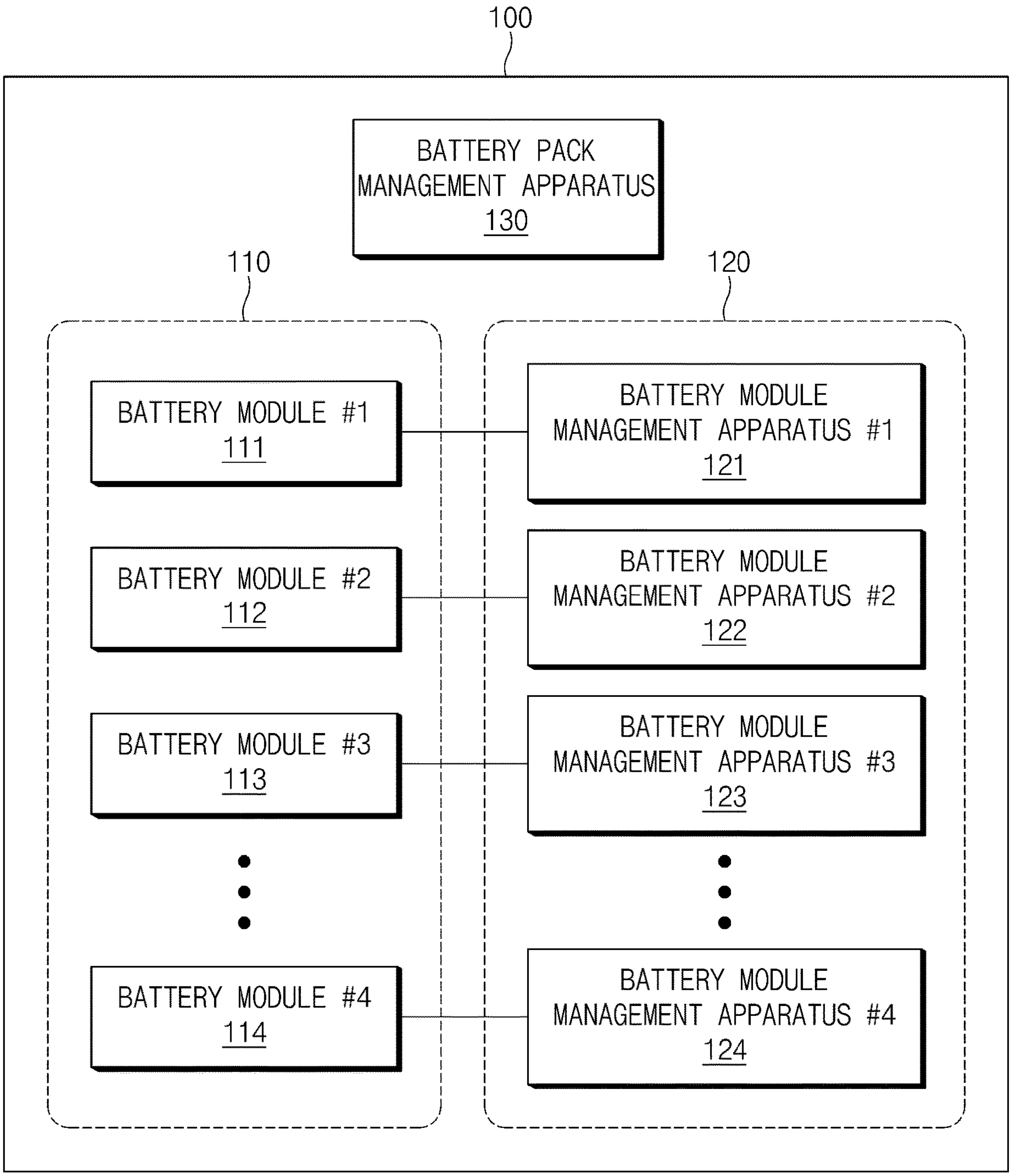
FIG. 2 shows a battery management system including a battery management apparatus according to an embodiment disclosed herein.

FIG. 2 shows a battery management system including a battery management apparatus according to an embodiment disclosed herein.

Referring to FIG. 2, the battery management system 100 may include one or more battery modules 110, a battery module management apparatus 120 managing each battery module, and the battery pack management apparatus 130 managing the battery module management apparatus. According to an embodiment disclosed herein, the number of battery module management apparatus and battery modules is not limited to the number of those shown in the drawing, and the number may be changed by adding or excluding battery module management apparatuses and battery modules, etc. In an example, the battery module 110 may correspond to a vehicle battery module. In an example, the battery pack management apparatus 130 may include firmware (F/W) embedded therein. In an example, the firmware embedded in the battery pack management apparatus 130 may correspond to vehicle firmware. In an example, data transmission or reception may be possible between the battery pack management apparatus 130 and the battery module management apparatus 120, and data transmission or reception between the one or more battery module management apparatuses 120 may be possible. For data transmission or reception according to an embodiment disclosed herein, the battery pack management apparatus 130 and the one or more battery module management apparatuses 120 may be connected through mutual wired or wireless communication, and the one or more battery module management apparatuses 120 may also be connected through mutual wired or wireless communication.

According to an embodiment disclosed herein, when the battery management system 100 is updated, the firmware embedded in the battery pack management apparatus 130 may be updated. The battery pack management apparatus 130 may transmit the entire updated firmware or a part thereof to the one or more battery module management apparatuses 120 to update the battery module management apparatus 120. In an example, the battery pack management apparatus 130 may transmit information corresponding to the updated part to the one or more battery module management apparatuses 120 in the updated firmware. According to an embodiment disclosed herein, when the battery pack management apparatus 130 may batch the entire updated firmware or a part thereof to the battery module management apparatus 120. In another example, the battery pack management apparatus 130 may divide the firmware to be transmitted to generate firmware packet information, and transmit the divided firmware packet information to the battery module management apparatus 120 several times.

The one or more battery module management apparatuses 120 may be connected to each of the one or more battery modules 110 to monitor the state of the battery module 110. In an example, the state information of the battery module 110 monitored by the battery module management apparatus 120 may correspond to battery related information such as a temperature T, a voltage V, a current I, a state of charge (SoC), a state of health (SoH), a state of power (SoP), etc., of the battery. In an example, a battery module management apparatus #1 121 may be connected to a battery module #1 111 to monitor the state of the battery module #1 111. In an example, a battery module management apparatuses #2 122 may be connected to a battery module #2 112 to monitor the state of the battery module #2 112. In an example, a battery module management apparatuses #3 123 may be connected to a battery module #3 113 to monitor the state of the battery module #3 113. In an example, a battery module management apparatuses #4 124 may be connected to a battery module #4 114 to monitor the state of the battery module #4 114. According to an embodiment disclosed herein, the number of battery module management apparatus and battery modules is not limited to the number of those shown in the drawing, and the number may be changed by adding or excluding battery module management apparatuses and battery modules, etc. As such, even when the number of battery module management apparatuses included in the battery management system 100 changes, an operation according to an embodiment disclosed herein may be performed in the same manner.

According to an embodiment disclosed herein, when the battery module management apparatus 120 monitors each connected battery module 110, the battery module management apparatus 120 may transmit the monitored battery data information to the battery pack management apparatus 130. In an example, the battery module management apparatus 120 may further transmit battery data information obtained by monitoring each connected battery module to at least some of the other battery module management apparatuses 120. According to a detailed example of the present disclosure, the battery module management apparatus #1 121 may transmit battery data information obtained by monitoring the battery module #1 111 to the battery pack management apparatus 130. According to a detailed example of the present disclosure, the battery module management apparatus #1 121 may further transmit battery data information obtained by monitoring the battery module #1 111 to at least any one of the other battery pack management apparatuses #2 122, #3 123, and #4 124. In an example, the battery module management apparatus #2 122, #3 123, or #4 124 may operate in the same manner to the battery module management apparatus #1 121 according to an embodiment disclosed herein.

Figure 3:
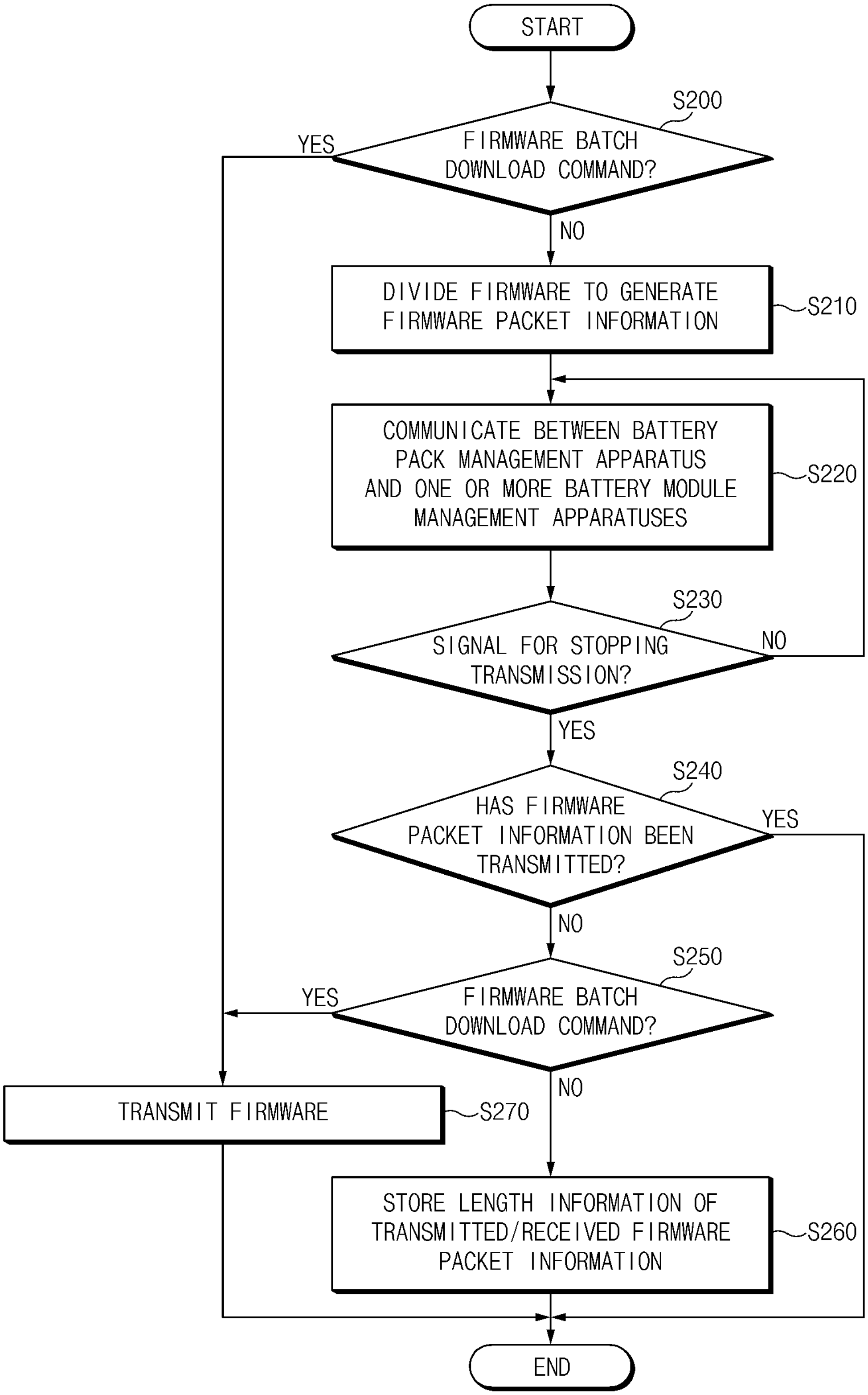
FIG. 3 is an operating flowchart illustrating an operating method of a battery management system, according to an embodiment disclosed herein.

FIG. 3 is an operating flowchart illustrating an operating method of a battery management system, according to an embodiment disclosed herein. Operations of the operating flowchart shown below may be implemented by a battery management system or a component included therein (e.g., a controller 310).

Referring to FIG. 3, the battery management system 100 may perform operation S260 of transmitting firmware embedded in the battery pack management apparatus 130 to the one or more battery module management apparatuses 120 according to an embodiment disclosed herein, and operation S210 of dividing the firmware embedded in the battery pack management apparatus 130 to generate firmware packet information and operation S220 of communicating between the battery pack management apparatus 130 and the one or more battery module management apparatuses 120 by transmitting and receiving data therebetween according to another embodiment disclosed herein.

Operation S260 of transmitting, by the battery management system 100 according to an embodiment disclosed herein, the firmware embedded in the battery pack management apparatus 130 to the one or more battery module management apparatuses 120 may be performed when there is an input operation S200 or S250 of a firmware batch download command from a user to the battery management system 100.

Operation S200 may correspond to an operation in which the battery management system 100 receives, from the user, an input of whether to batch the updated firmware when the battery management system 100 according to an embodiment disclosed herein is converted from an off stage to an on stage or the firmware embedded in the battery pack management apparatus 130 is updated in the on stage. In an example, when the user inputs a batch download command of the updated firmware to the battery management system 100 through operation S200, the battery pack management apparatus 130 may transmit the entire updated firmware or a part thereof to the one or more battery module management apparatuses 120. In this case, in an example according to the present disclosure, when the battery pack management apparatus 130 transmits a part of the firmware to the one or more battery module management apparatuses 120, the transmitted part of the firmware may correspond to an updated part of the entire firmware configuration.

In operation S200 according to an embodiment disclosed herein, when it is determined that the battery management system 100 does not receive the batch download command of the firmware, the battery pack management apparatus 130 may divide the updated firmware to generate firmware packet information in operation S210. In an example, in operation S210, the battery pack management apparatus may divide the entire firmware having been updated or a part thereof to generate firmware packet information. In an example, when a part of the firmware having been updated is divided to generate firmware packet information, the part of the firmware may correspond to firmware information corresponding to the part updated from the existing firmware.

According to an embodiment disclosed herein, the battery pack management apparatus 130 may transmit the firmware packet information generated in operation S210 to the one or more battery module management apparatuses 120 several times, and the battery module management apparatus 120 may perform a communication operation related to data transmission and reception between the battery pack management apparatus and the one or more battery module management apparatuses by transmitting battery data information of a battery module monitored by the battery module management apparatus 120 to the battery pack management apparatus 130 or further transmitting the battery data information to the other battery module management apparatuses, in operation S220. A detailed description of operation S220 will be described in detail with reference to FIG. 4.

After operation S220 is performed according to an embodiment disclosed herein, the battery management system 100 may further perform an operation of determining whether a signal for stopping data transmission exists from an internal or external source of the system, in operation S230. For example, the signal for stopping data transmission in operation S230 may correspond to a signal for conversion to the off stage of the battery management system 100, input from the user. In another example, the signal for stopping data transmission in operation S230 may correspond to a signal for indicating that divided pieces of firmware packet information are transmitted from the battery pack management apparatus 130 to the battery module management apparatus 120. In an example, when it is determined that the signal for stopping data transmission does not exist in the battery management system 100, the battery pack management apparatus and the one or more battery module management apparatuses may repeat operation S220.

According to an embodiment disclosed herein, when it is determined that the signal for stopping data transmission exists in the battery management system 100, the battery management system 100 may perform an operation of determining whether all of the divided pieces of the firmware packet information have been transmitted to the battery module management apparatus 120 from the battery pack management apparatus 130, in operation S240. When it is determined in operation S240 that some or all of the divided pieces of the firmware packet information have not been transmitted to the battery module management apparatus 120, the battery management system 100 may receive a command of whether to batch the updated firmware from the user, in operation S250. For example, when it is determined in operation S240 that all of the divided pieces of the firmware packet information have been transmitted to the battery module management apparatus 120, the battery management system 100 may terminate update of firmware or be converted to the off stage thereof to terminate the system.

In operation S250 according to an embodiment disclosed herein, when it is determined that the battery management system 100 receives the firmware batch download command from the user, the battery management system 100 may perform operation S260 of transmitting the firmware embedded in the battery pack management apparatus 130 to the one or more battery module management apparatuses 120. In an example, when it is determined in operation S250 that the firmware batch download command is not input, the battery pack management apparatus 130 may further store the length information of the transmitted firmware packet information, in operation S270. In another example, when it is determined in operation S250 that the firmware batch download command is not input, the battery module management apparatus 120 may further store the length information of the received firmware packet information, in operation S270. According to an embodiment disclosed herein, by further storing the length information of the transmitted or received firmware packet information in operation S270 even when the battery management system 100 is terminated without completion of transmission of the firmware packet information to the battery module management apparatus 120, the battery management system 100 may merely transmit existing firmware packet information that has not been transmitted, when resuming the operation thereof. In this case, an advantage may be that it is possible to prevent unnecessary repetition of transmission of the existing firmware packet information having been transmitted.

Operation S260 according to an embodiment disclosed herein may correspond to an operation of transmitting the entire firmware embedded in the battery pack management apparatus 130 or a part thereof to the one or more battery module management apparatuses 120. In an example, operation S260 may correspond to an operation of transmitting, by the battery pack management apparatus 130, the entire updated firmware. In an example, operation S260 may correspond to an operation of transmitting, by the battery pack management apparatus 130, firmware information (i.e., a part of the updated firmware) corresponding to an updated part of the existing firmware. In an example, operation S260 may correspond to an operation of batching the entire firmware including transmitted pieces of the firmware packet information or a part thereof or an operation of batching the other pieces of the firmware packet information not transmitted, after the battery pack management apparatus 130 transmits some of the divided pieces of the firmware packet information.

Figure 4:
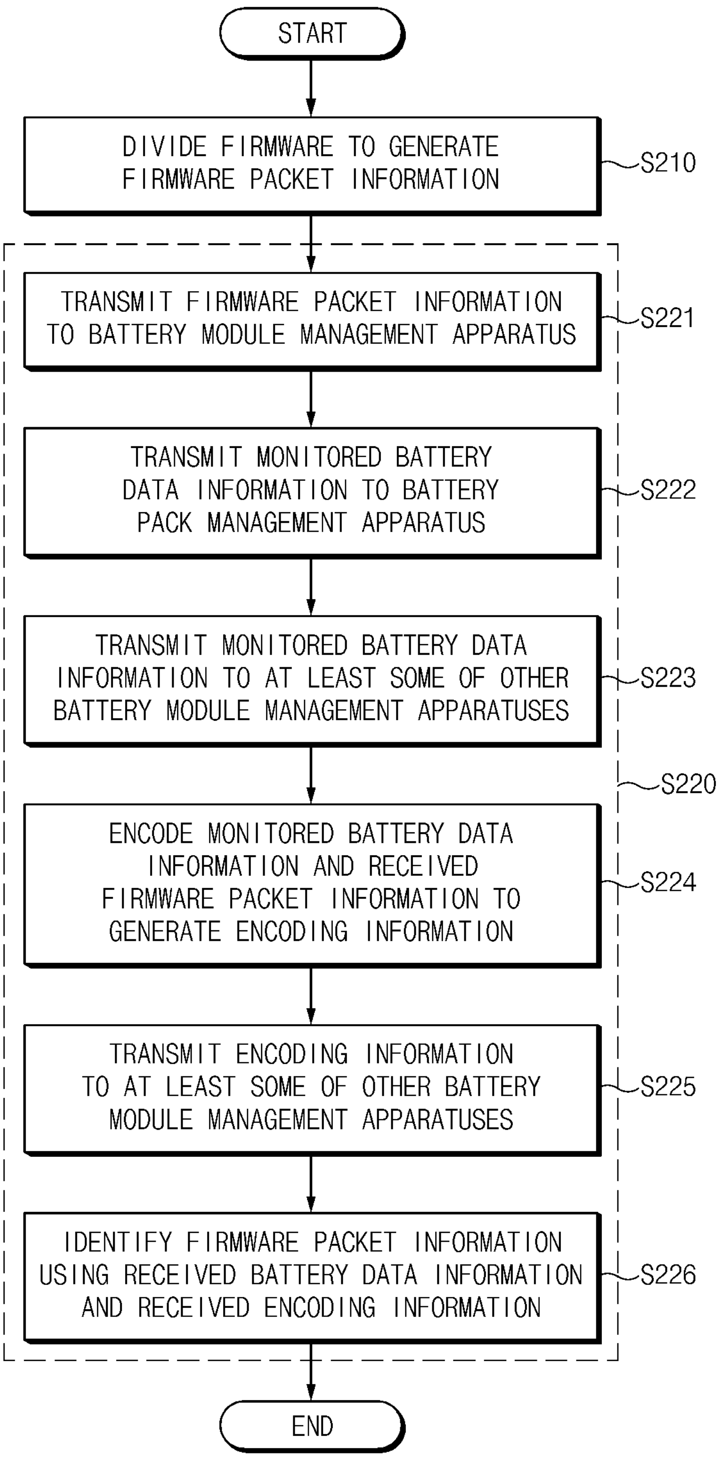
FIG. 4 is an operating flowchart illustrating an operating method of a battery management system, according to an embodiment disclosed herein.

FIG. 4 is an operating flowchart illustrating an operating method of a battery management system, according to an embodiment disclosed herein. Operations shown in FIG. 4 may correspond to a detailed example of operation S220 of FIG. 3. The battery management system may repeatedly perform operation S220 according to an embodiment disclosed herein and repeatedly perform operations shown in FIG. 4, which correspond to a detailed example of operation S220, in the same manner.

Referring to FIG. 4, an operating method of a battery management system may include operation S210 of dividing firmware updated in the battery pack management apparatus 130 to generate firmware packet information and operation S221 of transmitting, by the battery pack management apparatus 130, the firmware packet information generated in operation S210 to the one or more battery module management apparatuses 120. According to an embodiment disclosed herein, when firmware to be transmitted by the battery pack management apparatus is divided into a total of N pieces of firmware packet information (N is a natural number greater than or equal to 2), then the battery pack management apparatus 130 may transmit each piece of the firmware packet information to the one or more battery module management apparatuses 120 over N times according to a designated order.

In an example, an order of transmitting each piece of the firmware packet information to the one or more battery module management apparatuses 120 during repetition of operation S221 may be designated as sequential transmission according to an order in which the firmware packet information is sequentially divided. In an example, an order of transmitting each piece of the firmware packet information to the one or more battery module management apparatuses 120 during repetition of operation S221 may be designated as an order in which the firmware packet information is transmitted from largest to smallest or an order in which the firmware packet information is transmitted from smallest to largest, depending on a size. In an example, an order of transmitting each piece of the firmware packet information to the one or more battery module management apparatuses 120 during repetition of operation S221 may be designated as following a scheme arbitrarily designed by a user. According to an embodiment disclosed herein, a total of N divided pieces of the firmware packet information (N is equal to or greater than 2) may be indicated by $P_1$, $P_2$, $P_3$, . . . , $P_N$ according to an order in which they are transmitted.

The operating method of the battery management system may include operation S222 of transmitting, by the one or more battery module management apparatuses 120, battery data information of each monitored battery module to the battery pack management apparatus 130 according to a designated order when the battery pack management apparatus 130 one piece of firmware packet information (e.g., $P_m$ in which 1≤m≤N) among pieces of the firmware packet information (e.g., $P_1$, $P_2$, $P_3$, . . . , $P_N$) according to a designated order. In an example, battery data information obtained by monitoring, by the battery module management apparatus #1, 121, #2 122, #3 123, or #4 124, the battery module #1 111, #2 112, #3 113, or #4 114 connected thereto, may be referred to as $D_m$1, $D_m$2, $D_m$3, or $D_m$4. The battery management system according to an embodiment disclosed herein may perform operation S222 at a point before the battery pack management apparatus 130 transmits second firmware packet information (e.g., $P_{m+1}$), after transmitting first firmware packet information (e.g., $P_m$), to the one or more battery module management apparatuses 120. In this case, the one or more battery module management apparatuses 120 may perform an operation of transmitting monitored battery data information (e.g., $D_m$1, $D_m$2, $D_m$3, or $D_m$4) to the battery pack management apparatus 130 even during transmission of the divided pieces of the firmware packet information, such that the amount of battery data information of each battery module 110, which may be lost during batch update of the battery management system 100, may be reduced.

The operating method of the battery management system may further include operation S223 of transmitting the battery data information (e.g., the data $D_m$1, $D_m$2, $D_m$3, or $D_m$4) obtained by monitoring, by the battery module management apparatus 120, each connected battery module 110, to at least some of the other battery module management apparatuses according to an embodiment disclosed herein. According to a detailed example of the present disclosure, the operating method may further include an operation of, by the battery module management apparatus #1 121, transmitting battery data information (e.g., data $D_m$1) obtained by monitoring the battery module #1 111 to at least any one of the other battery pack management apparatuses #2 122, #3 123, and #4 124. As various examples of operation S223, the battery module management apparatus #2 122, #3 123, or #4 124 may operate in the same manner to the battery module management apparatus #1 121 according to an example disclosed herein to further perform an operation of transmitting the monitored battery data information (e.g., the data $D_m$2, $D_m$3, or $D_m$4) of the battery module #2 112, #3 113, or #4 114 to at least some of the other battery module management apparatuses.

The operating method of the battery management system may further include operation S224 of collectively encoding the battery data information (e.g., the data $D_m$1, $D_m$2, $D_m$3, or $D_m$4) obtained by monitoring each connected battery module 110 in the battery module management apparatus 120 according to an embodiment disclosed herein and the firmware packet information (e.g., $P_m$) received by the battery module management apparatus 120 from the battery pack management apparatus 130 in a designated order according to an embodiment disclosed herein to generate encoding information. As a detailed example of operation S224, an operation may be further performed in which the battery module management apparatus #1 121 encodes the battery data information (e.g., the data $D_m$1) of the monitored battery module #1 and the received firmware packet information (e.g., $P_m$) to generate encoding information $I_m$1 when the divided firmware packet information (e.g., $P_m$) is transmitted to the one or more battery module management apparatuses 120 from the battery pack management apparatus 130. As a detailed example of operation S224, an operation may be further performed in which the battery module management apparatus #2 122, #3 123, or #4 124 operates in the same manner to the battery module management apparatus #1 121 according to an embodiment disclosed herein to generate each encoding information $I_m$2, $I_m$3, or $I_m$4.

The operating method of the battery management system may further include operation S225 of transmitting the encoding information (e.g., $I_m$1, $I_m$2, $I_m$3, or $I_m$4) generated in the one or more battery module management apparatuses 120 to at least some of the other battery module management apparatuses. In operation S225, when the encoding information (e.g., $I_m$1, $I_m$2, $I_m$3, or $I_m$4) generated by the one or more battery management modules 120 is transmitted, the encoding information may be further transmitted to the battery pack management apparatus 130.

According to a detailed example of operation S225, the battery module management apparatus #1 121 may transmit the encoding information (e.g., $I_m$1) generated in operation S224 to at least some of the other battery pack management apparatuses #2 122, #3 123, and #4 124. As a detailed example of operation S225, an operation may be further performed in which the battery module management apparatus #2 122, #3 123, or #4 124 operates in the same manner to the battery module management apparatus #1 121 according to an embodiment disclosed herein to transmit the generated encoding information (e.g., $I_m$2, $I_m$3, or $I_m$4) to at least some of the other battery module management apparatuses.

The operating method of the battery management system may further include operation S226 of identifying, by the battery module management apparatus according to an example disclosed herein, firmware packet information using battery data information and encoding information transmitted from the other battery module management apparatuses. As a detailed example of operation S226, the battery module management apparatus #2 122 may receive battery data information (e.g., $D_m$1, $D_m$3, and/or $D_m$4) of respectively monitored battery modules from the battery module management apparatuses #1 121, #3 123, and/or #4 124 according to an embodiment disclosed herein, and receive the encoding information (e.g., $I_m$1, $I_m$3, and/or $I_m$4) generated in the battery module management apparatuses #1 121, #3 123, and/or #4 124 according to an embodiment disclosed herein. In an example, when the battery data information (e.g., $D_m$1) monitored and the encoding information (e.g., $I_m$1) generated in the battery module management apparatus #1 121 are transmitted to the battery module management apparatus #2 122 according to an embodiment disclosed herein, the battery module management apparatus #2 122 may compare the received battery data information (e.g., $D_m$1) with a result of decoding the encoding information (e.g., $I_m$1) to identify the firmware packet information (e.g., $P_m$) transmitted from the battery pack management apparatus 130. According to an embodiment disclosed herein, even when the battery module management apparatus #2 122 fails to normally receive the firmware packet information (e.g., $P_m$) transmitted from the battery pack management apparatus 130, the battery module management apparatus #2 122 may identify the firmware packet information (e.g., $P_m$) by using the battery data information (e.g., $D_m$1) and the encoding information (e.g., $I_m$1) received from the battery module management apparatus #1 121, such that the battery management system 100 may normally perform updating. As such, even when the battery pack management apparatus 130 is in a poor communication state with a part of the battery module management apparatus 120, the battery management system 100 may normally perform updating.

Figure 5:
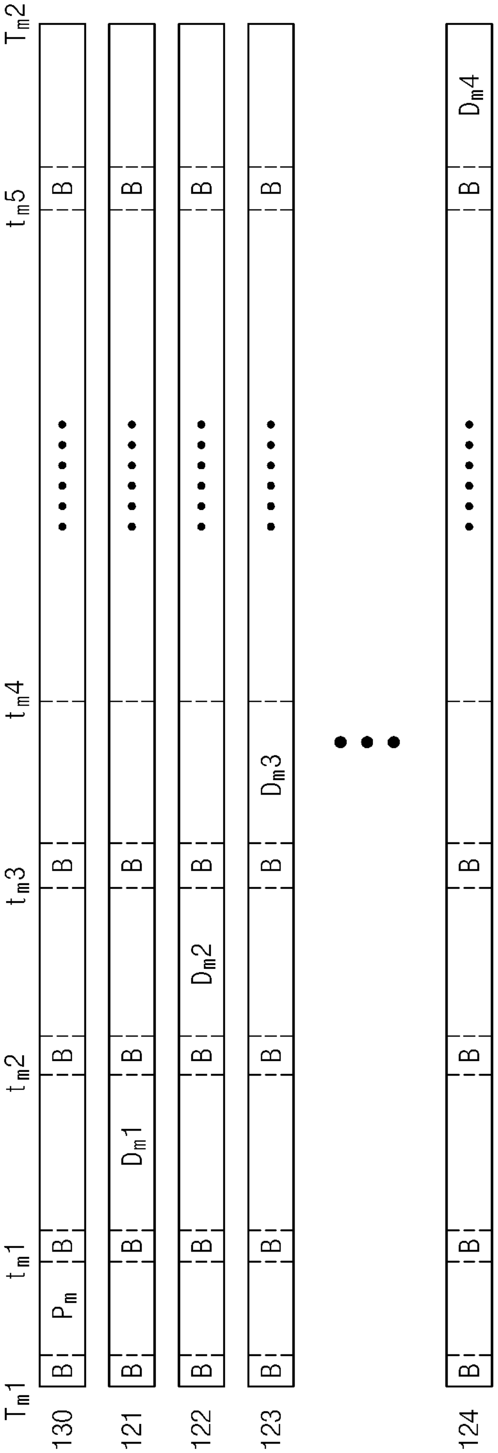
FIG. 5 is a diagram showing a data communication progress process over time in a battery management system, according to an embodiment disclosed herein.

FIG. 5 is a diagram showing a data communication progress process over time in a battery management system, according to an embodiment disclosed herein. FIG. 5 may be referred to for description of operations S221, S222, and S223 shown in FIG. 4 according to an embodiment disclosed herein.

Referring to FIG. 5, the battery pack management apparatus 130 may transmit a beacon signal B to the one or more battery management apparatuses 120 or receive the beacon signal B from the one or more battery module management apparatuses 120 to transmit the divided firmware packet information to the one or more battery module management apparatuses 120 and receive the battery data information (e.g., $D_m$1, $D_m$2, $D_m$3, or $D_m$4) from the battery management apparatus 120. For example, the beacon signal may correspond to an informational beacon signal indicating position information of each of the battery pack management apparatus 130 or the one or more battery module management apparatus 120, etc. In an example, the beacon signal B may be transmitted before firmware packet information or each piece of battery data information is transmitted.

In an example, when the firmware embedded in the battery pack management apparatus 130 is divided into a total of N (N is a natural number equal to or greater than 2) pieces of firmware packet information, firmware packet information transmitted $m^{th}$ in a designated order according to an embodiment disclosed herein may be referred to as $P_m$ ($1 \leq m \leq N$). In an example, when the battery pack management apparatus 130 transmits the firmware packet information (e.g., $P_m$), the battery pack management apparatus 130 may receive each monitored battery module data (e.g., $D_m$1, $D_m$2, $D_m$3, or $D_m$4) from the one or more battery module management apparatuses 120 before transmitting firmware packet information (e.g., $P_m$+1) of the next order. In an example, $T_m$1, $T_m$2, $T_m$3, $t_m$1, $t_m$2, $t_m$3, $t_m$4, $t_m$5, $t_m$6, $t_m$7, $t_m$8, and $t_m$9 described below may correspond to data values indicating time.

In an example, during a time from $T_m$1 to $t_m$1, the battery pack management apparatus 130 may transmit the beacon signal B to the one or more battery module management apparatuses 120 and transmit the firmware packet information $P_m$. Each battery module management apparatus #1 121, #2 122, #3 123, or #4 124 may be in a state of receiving information transmitted from the battery pack management apparatus 130.

In an example, during a time from $t_m$1 to $t_m$2, the battery module management apparatus #1 121 may transmit the beacon signal B and battery data information $D_m$1 obtained by monitoring the battery module #1 111 to the battery pack management apparatus 130, and may further transmit the same information to at least some of the other battery module management apparatuses #2 122, #3 123, and #4 124. In this case, the battery pack management apparatus 130 or the other module management apparatuses #2 122, #3 123, and #4 124 may be in a state of receiving information transmitted from the battery module management apparatus #1 121.

In an example, during a time from $t_m$2 to $t_m$3, the battery module management apparatus #2 122 may transmit the beacon signal B and the battery data information $D_m$2 obtained by monitoring the battery module #2 122 to the battery pack management apparatus 130, and may further transmit the same information to at least some of the other battery module management apparatuses #1 121, #3 123, and #4 124. In this case, the battery pack management apparatus 130 or the other module management apparatuses #1 121, #3 123, and #4 124 may be in a state of receiving information transmitted from the battery module management apparatus #2 122.

In an example, during a time from $t_m$3 to $t_m$4, the battery module management apparatus #3 123 may transmit the beacon signal B and battery data information $D_m$3 obtained by monitoring the battery module #3 113 to the battery pack management apparatus 130, and may further transmit the same information to at least some of the other battery module management apparatuses #1 121, #2 122, and #4 124. In this case, the battery pack management apparatus 130 or the other module management apparatuses #1 121, #2 122, and #4 124 may be in a state of receiving information transmitted from the battery module management apparatus #3 123.

In an example, during a time from $t_m$5 to $T_m$2, the battery module management apparatus #4 124 may transmit the beacon signal B and battery data information $D_m$4 obtained by monitoring the battery module #4 114 to the battery pack management apparatus 130, and may further transmit the same information to at least some of the other battery module management apparatuses #1 121, #2 122, and #3 123. In this case, the battery pack management apparatus 130 or the other module management apparatuses #1 121, #2 122, and #3 123 may be in a state of receiving information transmitted from the battery module management apparatus #4 124.

According to an embodiment disclosed herein, when the battery pack management apparatus 130 or any one of the one or more battery module management apparatuses 120 is in a state of transmitting data (e.g., $P_m$, $D_m$1, $D_m$2, $D_m$3, $D_m$4, etc.), the other apparatuses may be in a state of receiving transmitted data. According to an embodiment disclosed herein, an order in which the battery pack management apparatus 130 or any one of the one or more battery module management apparatuses 120 transmits the data (e.g., $P_m$, $D_m$1, $D_m$2, $D_m$3, $D_m$4, etc.) may be changed and designated at random. According to an embodiment disclosed herein, even when the number of battery module management apparatuses included in the battery management system 100 changes, an operation according to an embodiment disclosed herein may be performed in the same manner.

Figure 6:
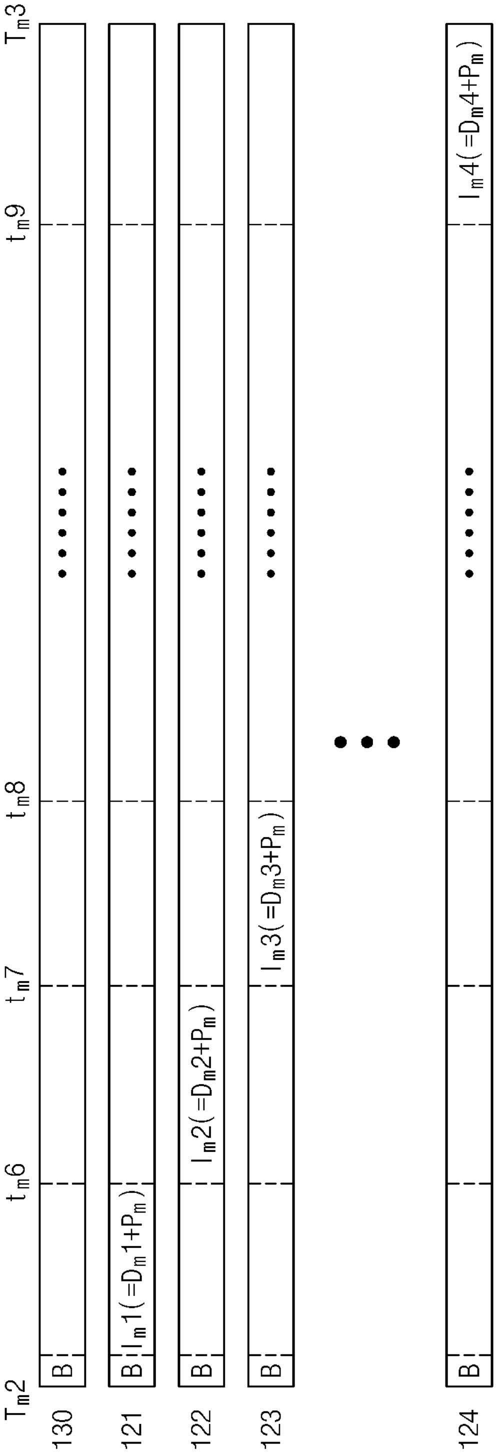
FIG. 6 is a diagram showing a data communication progress process over time in a battery management system, according to an embodiment disclosed herein.

FIG. 6 is a diagram showing a data communication progress process over time in a battery management system, according to an embodiment disclosed herein. FIG. 6 may be referred to for description of operations S224, S225, and S226 shown in FIG. 4 according to an embodiment disclosed herein.

Referring to FIG. 6, the one or more battery module management apparatuses 120 may encode monitored battery data information of the battery module 110 and firmware packet information (e.g., $P_m$) received from the battery pack management apparatus 130 together to generate encoding information, and transmit each encoding information to at least some of the other battery module management apparatuses. According to an embodiment disclosed herein, the battery module management apparatus 120 may further transmit encoding information thereof to the battery pack management apparatus.

In an example, the battery module management apparatus #1 121 may encode the battery data information $D_m$1 obtained by monitoring the battery module #1 111 and the firmware packet information (e.g., $P_m$) received from the battery pack management apparatus 130 together to generate the encoding information $I_m$1. In an example, when the battery module management apparatus #1 121 generates the encoding information $I_m$1, the battery module management apparatus #1 121 may transmit the encoding information $I_m$1 to at least some of the other battery module management apparatuses #2 122, #3 123, and #4 124 during a time from $T_m$2 to $t_m$6. In this case, the other module management apparatuses #2 122, #3 123, and #4 124 may be in a state of receiving information transmitted from the battery module management apparatus #1 121.

In an example, the battery module management apparatus #2 122 may encode the battery data information $D_m$2 obtained by monitoring the battery module #2 112 and the firmware packet information (e.g., $P_m$) received from the battery pack management apparatus 130 together to generate the encoding information $I_m$2. In an example, when the battery module management apparatus #2 122 generates the encoding information $I_m$2, the battery module management apparatus #2 122 may transmit the encoding information $I_m$2 to at least some of the other battery module management apparatuses #1 121, #3 123, and #4 124 during a time from $t_m$6 to $t_m$7. In this case, the other module management apparatuses #1 121, #3 123, and #4 124 may be in a state of receiving information transmitted from the battery module management apparatus #2 122.

In an example, the battery module management apparatus #3 123 may encode the battery data information $D_m$3 obtained by monitoring the battery module #3 113 and the firmware packet information (e.g., $P_m$) received from the battery pack management apparatus 130 together to generate the encoding information $I_m$3. In an example, when the battery module management apparatus #3 123 generates the encoding information $I_m$3, the battery module management apparatus #3 123 may transmit the encoding information $I_m$3 to at least some of the other battery module management apparatuses #1 121, #2 122, and #4 124 during a time from $t_m$7 to $t_m$8. In this case, the other module management apparatuses #1 121, #2 122, and #4 124 may be in a state of receiving information transmitted from the battery module management apparatus #3 123.

In an example, the battery module management apparatus #4 124 may encode the battery data information $D_m$4 obtained by monitoring the battery module #4 114 and the firmware packet information (e.g., $P_m$) received from the battery pack management apparatus 130 together to generate the encoding information $I_m$4. In an example, when the battery module management apparatus #4 124 generates the encoding information $I_m$4, the battery module management apparatus #4 124 may transmit the encoding information $I_m$4 to at least some of the other battery module management apparatuses #1 121, #2 122, and #3 123 during a time from $t_m$8 to $T_m$3. In this case, the other module management apparatuses #1 121, #2 122, and #3 123 may be in a state of receiving information transmitted from the battery module management apparatus #4 124.

When the one or more battery module management apparatuses receive the battery data information (e.g., $D_m$1, $D_m$2, $D_m$3, or $D_m$4) and the encoding information (e.g., $I_m$1, $I_m$2, $I_m$3, or $I_m$4) from the other battery module management apparatuses, the firmware packet information (e.g., $P_m$) may be identified using the received battery data information and encoding information. In an example, when the battery module management apparatus #2 122 receives the battery data information (e.g., $D_m$2) and the encoding information (e.g., $I_m$2) from the battery module management apparatus #1 121, the received encoding information (e.g., $I_m$2) may be decoded and decoding result data may be compared with the battery data information (e.g., $D_m$2) to identify the firmware packet information (e.g., $P_m$). In this case, even when the battery module management apparatus #2 122 may not be able to normally perform data communication with the battery pack management apparatus 130 and thus may fail to directly receive firmware packet information, the firmware packet information may be identified by using the received battery data information and encoding information, thereby normally performing updating of the battery management system 100. In an example, the battery module management apparatus #1 121, #3 123, or #4 124 may operate in the same manner to the battery module management apparatus #2 122 according to an embodiment disclosed herein.

Figure 7:
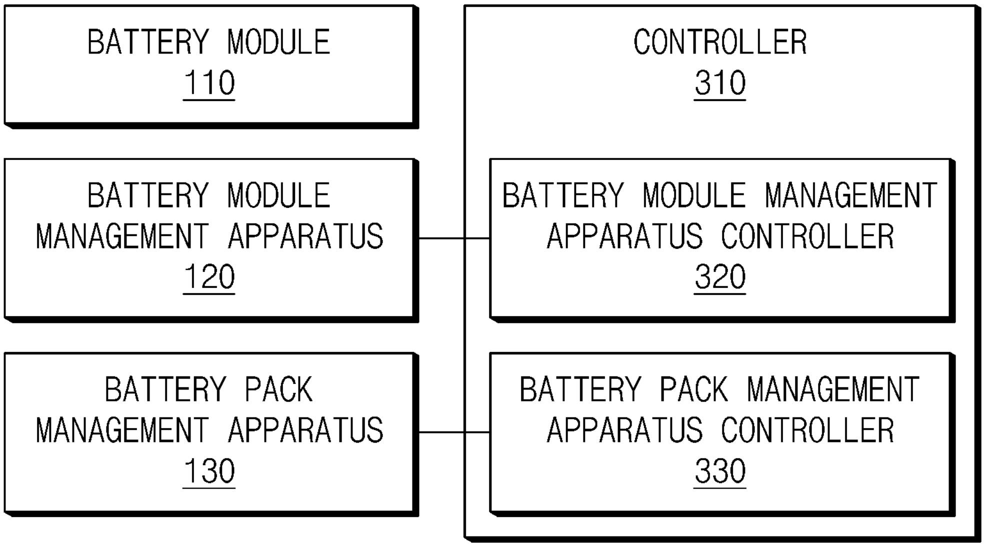
FIG. 7 is a functional block diagram of a battery management apparatus according to an embodiment disclosed herein.

FIG. 7 is a functional block diagram of a battery management apparatus according to an embodiment disclosed herein. A component shown in FIG. 7 may be a hardware device or a program (or an application) including instructions.

The controller 310 may be a hardware device such as a processor or a central processing unit (CPU) or a program implemented by the hardware device. The controller 310 may be connected to components of the battery management system to perform an overall function of the battery management system. In an embodiment, the controller 310 may control the battery module management apparatus 120 to monitor a state of each connected battery module and to transmit monitored battery data information to the battery pack management apparatus 130. In an embodiment, the controller may control the battery pack management apparatus 130 to divide the firmware embedded in the battery pack management apparatus to generate firmware packet information and to transmit the divided firmware packet information to each battery module management apparatus 120.

In an embodiment, the controller 310 may be further configured to, by controlling the battery pack management apparatus 130, transmit the non-divided firmware to the one or more battery module management apparatuses 120 when a firmware batch download command is input according to a scheme designated in the battery pack management apparatus. In this case, a description of FIGS. 2 to 4 will be referred to in relation to the designated scheme of the firmware batch download command.

In an embodiment, the controller 310 may be further configured to, by controlling the battery pack management apparatus 130, transmit length information of the firmware packet information to the battery module management apparatus to be stored. In this case, a description of FIG. 3 will be referred to in relation to the operation of storing the length information.

In an embodiment, the controller 310 may be further configured to, by controlling the battery module management apparatus 120, transmit the monitored battery data information to at least some of the other battery module management apparatuses. In this case, a description of FIGS. 2 to 5 will be referred to in relation to the operation of transmitting the battery data information.

In an embodiment, the controller 310 may be further configured to, by controlling the battery module management apparatus 120, encode the monitored battery data information together with the firmware packet information from the battery pack management apparatus 130 to generate encoding information, and to transmit the generated encoding information to at least some of the other battery module management apparatuses. In this case, a description of FIGS. 2 to 6 will be referred to in relation to the operation of encoding and transmitting the encoding information.

In an embodiment, the controller 310 may be further configured to, by controlling the battery module management apparatus 120, identify the divided firmware packet information transmitted by the battery pack management apparatus 130 using the battery data information and the encoding information received from the other battery module management apparatuses. In this case, a description of FIGS. 2 to 6 will be referred to in relation to the operation of identifying the firmware packet information using the received battery data information and encoding information.

The controller 310 may control each component of the battery management system and to this end, the controller 310 may include a battery module management apparatus controller 320 and/or a battery pack management apparatus controller 330. Components included in the controller 310 may be implemented with individual devices (or programs) or as one integrated module.

Even though all components constituting an embodiment disclosed herein have been described above as being combined into one or operating in combination, the embodiments disclosed herein are not necessarily limited to the embodiments. That is, within the object scope of the embodiments disclosed herein, all the components may operate by being selectively combined into one or more.

Figure 8:
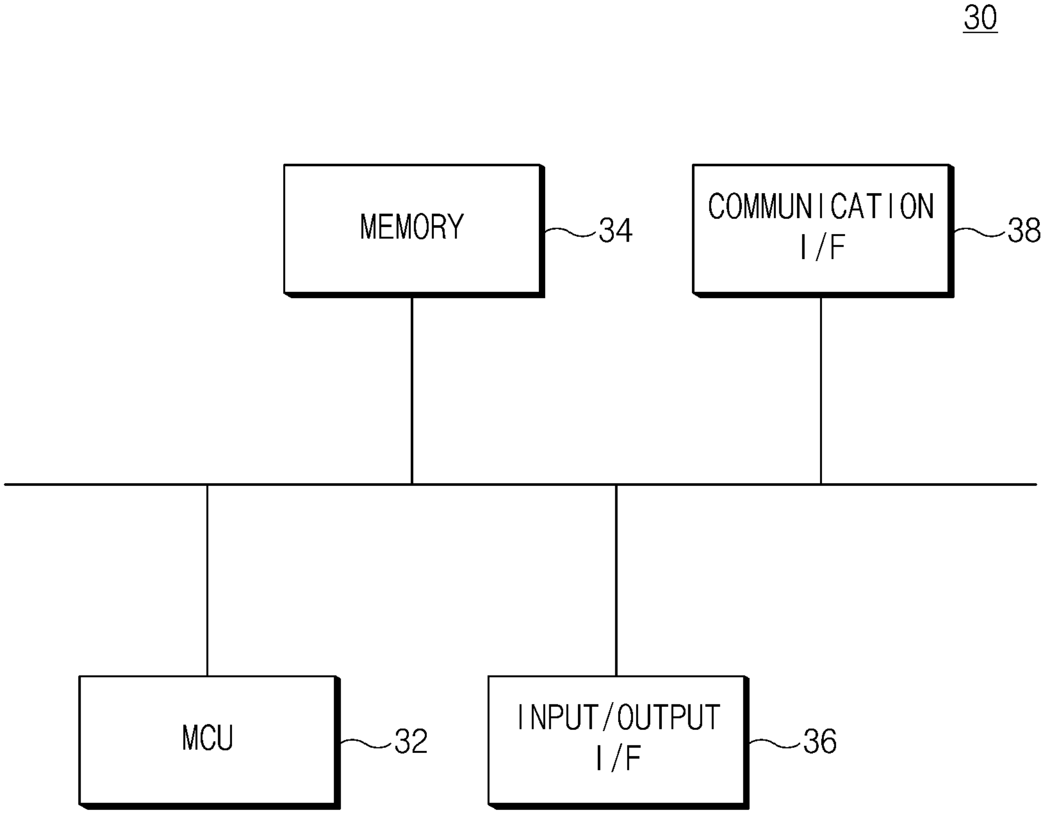
FIG. 8 is an operating flowchart to consume battery energy, according to an embodiment disclosed herein.

FIG. 8 is an operating flowchart to consume battery energy, according to an embodiment disclosed herein.

Referring to FIG. 8, a computing system 30 according to an embodiment disclosed herein may include an MCU 32, a memory 34, an input/output I/F 36, and a communication I/F 38.

The MCU 32 may be a processor that executes various programs (e.g., a feature calculation program, a class classification and lifespan estimation program, etc.) stored in the memory 34, processes various data including voltage, current, etc., of a battery cell through these programs, and executes the above-described functions of the battery management apparatus shown in FIGS. 2 to 7.

The memory 34 may store various programs regarding feature calculation, class classification, and lifespan estimation of the battery cell. Moreover, the memory 34 may store various data such as a voltage, a current, feature data, etc., of each battery cell.

The memory 34 may be provided in plural, depending on a need. The memory 34 may be volatile memory or nonvolatile memory. For the memory 34 as the volatile memory, random access memory (RAM), dynamic RAM (DRAM), static RAM (SRAM), etc., may be used. For the memory 34 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 34 are merely examples and are not limited thereto.

The input/output I/F 36 may provide an interface for transmitting and receiving data by connecting an input device (not shown) such as a keyboard, a mouse, a touch panel, etc., and an output device such as a display (not shown), etc., to the MCU 32.

The communication I/F 38, which is a component capable of transmitting and receiving various data to and from a server, may be various devices capable of supporting wired or wireless communication. For example, a program for feature calculation, class classification, and lifespan estimation for a battery cell or various data, etc., may be transmitted and received to and from a separately provided external server through the communication I/F 38.

As such, a computer program according to an embodiment disclosed herein may be recorded in the memory 34 and processed by the MCU 32, thus being implemented as a module that performs functions shown in FIG. 3 or 4.

Moreover, terms such as "include", "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art to which the embodiments disclosed herein pertain, unless defined otherwise. The terms used generally like terms defined in dictionaries should be interpreted as having meanings that are the same as the contextual meanings of the relevant technology and should not be interpreted as having ideal or excessively formal meanings unless they are clearly defined in the present document.

The above description is merely illustrative of the technical idea of the present disclosure, and various modifications and variations will be possible without departing from the essential characteristics of embodiments of the present disclosure by those of ordinary skill in the art to which the embodiments disclosed herein pertains. Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present document.

The invention claimed is:

1. A battery management system comprising:
   - a plurality of battery modules;
   - a plurality of battery module management apparatuses connected to the plurality of battery modules; and
   - a battery pack management apparatus having embedded therein firmware and configured to manage the plurality of battery module management apparatuses,
   - wherein the battery pack management apparatus is further configured to divide the firmware to generate divided firmware packet information and transmit the divided firmware packet information to the plurality of battery module management apparatuses,
   - wherein the plurality of battery module management apparatuses are further configured to monitor a state of the plurality of battery modules and transmit monitored battery data information to the battery pack management apparatus,
   - wherein the battery management system is configured to control a switch that controls charging or discharging of the plurality of battery modules to turn on or off based on the monitored battery data information,
   - wherein a number of the plurality of battery modules is equal to a number of the plurality of battery module management apparatuses and each respective battery module management apparatus of the plurality of battery module management apparatuses is connected to a different battery module of the plurality of battery modules, and
   - wherein the plurality of battery module management apparatuses are further configured to transmit the monitored battery data information to the battery pack management apparatus between transmission of different firmware packets of the divided firmware packet information.

2. The battery management system of claim 1, wherein the battery pack management apparatus is further configured to transmit a non-divided firmware to the plurality of battery module management apparatuses when a firmware batch download command is input according to a scheme designated in the battery pack management apparatus.

3. The battery management system of claim 1, wherein the battery pack management apparatus is further configured to store length information of the divided firmware packet information transmitted to the plurality of battery module management apparatuses.

4. The battery management system according to claim 1, wherein one or more of the plurality of battery module management apparatuses are further configured to transmit the monitored battery data information to at least some of other battery module management apparatuses of the plurality of battery module management apparatuses.

5. The battery management system of claim 4, wherein the one or more of the plurality of battery module management apparatuses are further configured to encode the monitored battery data information and the divided firmware packet information together to generate encoding information and transmit the encoding information to the at least some of the other battery module management apparatuses.

6. The battery management system of claim 5, wherein the one or more of the plurality of battery module management apparatuses are further configured to identify the divided firmware packet information by using the monitored battery data information and the encoding information received from another of the plurality of battery module management apparatuses.

7. The battery management system of claim 1, wherein each respective battery module management apparatus of the plurality of battery module management apparatuses is connected to the battery module of the plurality of battery modules through a respective wire.

8. An operating method of a battery management system, the operating method comprising:
   - dividing firmware embedded in a battery pack management apparatus to generate divided firmware packet information;
   - transmitting, by the battery pack management apparatus, the divided firmware packet information to a plurality of battery module management apparatuses;
   - monitoring, by the plurality of battery module management apparatuses, a state of a plurality of battery modules and transmitting monitored battery data information to the battery pack management apparatus, the transmitting of the monitored battery data information to the battery pack management apparatus including transmitting the monitored battery data information to the battery pack management apparatus between transmission of different firmware packets of the divided firmware packet information; and
   - controlling a switch that controls charging or discharging of the plurality of battery modules to turn on or off based on the monitored battery data information,
   - wherein a number of the plurality of battery modules is equal to a number of the plurality of battery module management apparatuses and each respective battery module management apparatus of the plurality of battery module management apparatuses is connected to a different battery module of the plurality of battery modules.

9. The operating method of claim 8, further comprising transmitting a non-divided firmware to the plurality of battery module management apparatuses when a firmware batch download command is input according to a scheme designated in the battery pack management apparatus.

10. The operating method of claim 8, further comprising storing, by the battery pack management apparatus, length information of the divided firmware packet information transmitted to the plurality of battery module management apparatuses.

11. The operating method according to claim 8, further comprising transmitting, by one or more of the plurality of battery module management apparatuses, the monitored battery data information to at least some of other battery module management apparatuses of the plurality of battery module management apparatuses.

12. The operating method of claim 11, further comprising:
   - encoding, by the one or more of the plurality of battery module management apparatuses, the monitored battery data information and the divided firmware packet information to generate encoding information; and
   - transmitting the encoding information to the at least some of the other battery module management apparatuses.

13. The operating method of claim 12, further comprising identifying, by the one or more of the plurality of battery module management apparatuses, the divided firmware packet information by using the monitored battery data information and the encoding information received from another of the plurality of battery module management apparatuses.

14. A battery management system comprising:

a plurality of battery modules;

a plurality of battery module management apparatuses respectively connected to the plurality of battery modules;

a battery pack management apparatus having embedded therein firmware and configured to manage the plurality of battery module management apparatuses; and a controller connected to the plurality of battery module management apparatuses and the battery pack management apparatus, wherein the controller is configured to:

by controlling the battery pack management apparatus, divide the firmware to generate divided firmware packet information and transmit the divided firmware packet information to the plurality of battery module management apparatuses; and by controlling the plurality of battery module management apparatuses, monitor a state of the plurality of battery modules and transmit monitored battery data information to the battery pack management apparatus, wherein the battery management system is configured to control a switch that controls charging or discharging of the plurality of battery modules to turn on or off based on the monitored battery data information, wherein a number of the plurality of battery modules is equal to a number of the plurality of battery module management apparatuses and each respective battery module management apparatus of the plurality of battery module management apparatuses is connected to a different battery module of the plurality of battery modules, and wherein the plurality of battery module management apparatuses are further configured to transmit the monitored battery data information to the battery pack management apparatus between transmission of different firmware packets of the divided firmware packet information.

15. The battery management system of claim 14, wherein the controller is further configured to, by controlling the battery pack management apparatus, transmit a non-divided firmware to the plurality of battery module management apparatuses when a firmware batch download command is input according to a scheme designated in the battery pack management apparatus.

16. The battery management system of claim 14, wherein the controller is further configured to, by controlling the battery pack management apparatus, store length information of the divided firmware packet information transmitted to the plurality of battery module management apparatuses.

17. The battery management system according to claim 14, wherein the controller is further configured to, by controlling one or more of the plurality of battery module management apparatuses, transmit the monitored battery data information to at least some of other battery module management apparatuses of the plurality of battery module management apparatuses.

18. The battery management system of claim 17, wherein the controller is further configured to, by controlling the one or more of the plurality of battery module management apparatuses, encode the monitored battery data information and the divided firmware packet information together to generate encoding information and transmit the encoding information to the at least some of the other battery module management apparatuses.

19. The battery management system of claim 18, wherein the controller is further configured to, by controlling the one or more of the plurality of battery module management apparatuses, identify the divided firmware packet information by using the monitored battery data information and the encoding information received from another of the plurality of battery module management apparatuses.

20. The battery management system of claim 14, wherein the controller comprises:

a battery module management apparatus controller configured to control the plurality of battery module management apparatuses through a first wired connection; and a battery pack management apparatus controller configured to control the battery pack management apparatus through a second wired connection.

* * * * *